Patented Apr. 30, 1929.

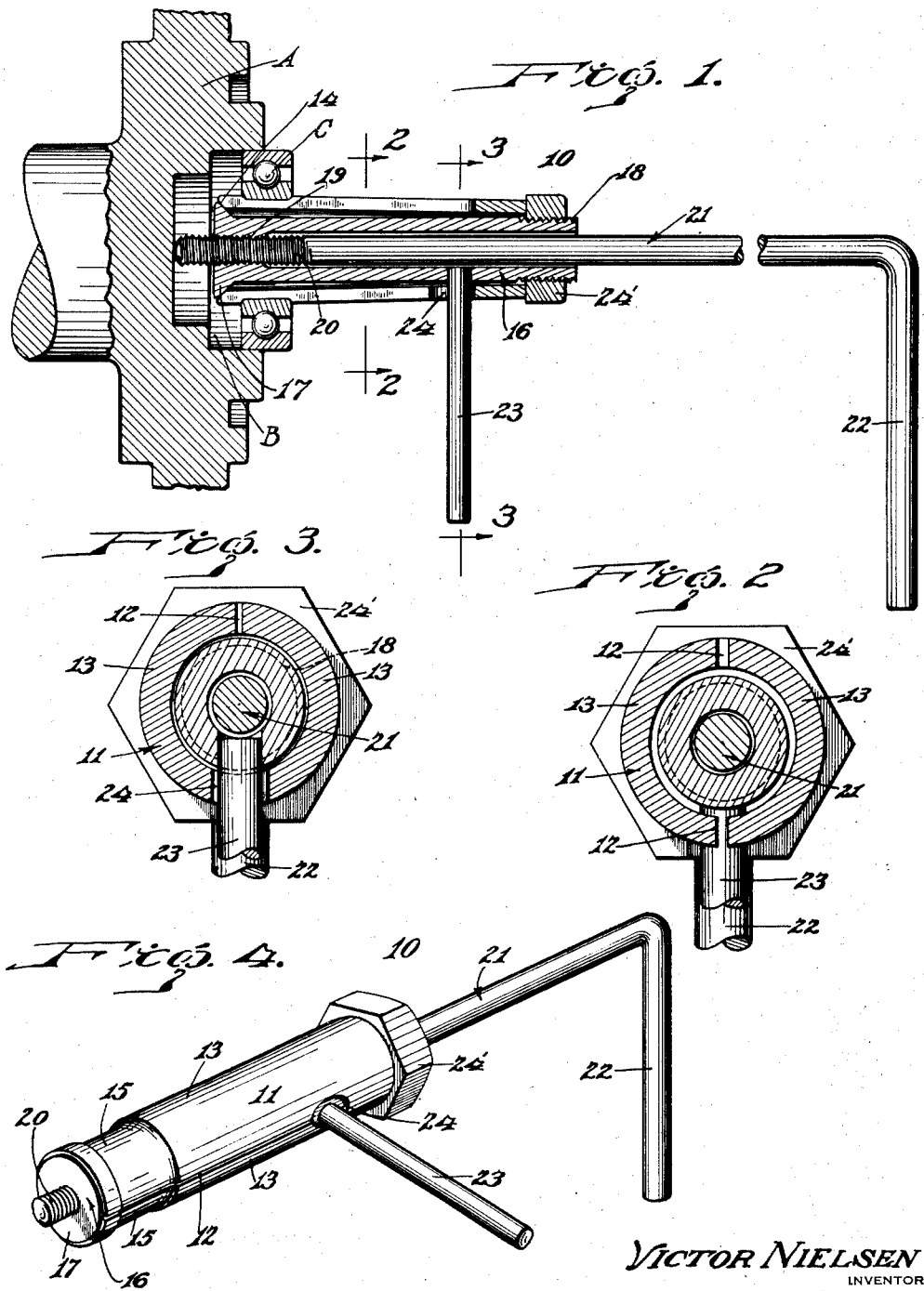

1,710,835

UNITED STATES PATENT OFFICE.

VICTOR NIELSEN, OF NEW YORK, N. Y.

BEARING REMOVER OR EXTRACTOR.

Application filed March 27, 1928. Serial No. 265,083.

This invention relates to improvements in bearing removers or extractors and has particular reference to a fly wheel bearing remover.

The primary object of the invention resides in a bearing remover for use in extracting bearings which are so located that access cannot be had to drive or pull the same loose by the use of ordinary tools, which is a fault now commonly found in certain types of automobile fly wheel bearings, and it is therefore my aim to quickly remove the same without causing mutilation of the bearing.

Another object of the invention is the provision of a bearing remover which is simple of construction, easy and positive of operation, and strong and durable for the purpose intended.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a vertical longitudinal sectional view through my improved bearing remover in use.

Figure 2 is a vertical transverse sectional view on the line 2—2 of Figure 1.

Figure 3 is a similar view on the line 3—3 of Figure 1.

Figure 4 is a perspective view of the remover per se.

In automobile repair work, it has been found extremely troublesome to remove the fly wheel bearing without mutilating the same to such an extent which renders it unfit for further use, as the same is so positioned in certain makes of automobiles that it cannot be pulled loose. It is therefore the purpose of this invention to provide a tool or instrument by which such a bearing may be easily removed without damage thereto.

Referring to the drawing by reference characters, the numeral 10 designates my improved bearing remover in its entirety, which includes an outer cylindrical metal casing 11 which has its diametrically opposed side walls slotted or bifurcated inwardly from one end thereof as at 12 to provide resilient jaws 13. The outer ends of the jaws 13 are provided with inwardly bevelled faces 14 while the exterior sides of the jaws are provided with recesses or seats 15 of a shape to fit the bearing to be removed.

Passing longitudinally through the cylindrical casing 11 and being of a length greater than the length of the casing is a sleeve 16 provided with a bevelled head 17 on one end and an exteriorly threaded portion 18 on its opposite end. The bevelled head 17 co-acts with the bevelled ends 14 of the jaws to expand the same into frictional engagement with the bearing in a manner to be hereinafter explained. The inner walls of the sleeve are screw-threaded as at 19 which serves as a bearing for the screw threaded end 20 of a screw rod 21 which extends axially through the sleeve and has its outer end bent at right angle to provide a handle 22. A handle 23 also extends from the sleeve 16 at right angle to the axis thereof and passes through an enlarged opening 24 in the side wall of the cylindrical casing 11 at the closed end of one of the slots 12 provided therein. Both handles 22 and 23 are grasped during the operation of the device, the handle 23 serving as a hand grip and preventing turning movement of the sleeve 16 with respect to the cylindrical casing and screw during turning of the latter.

The threaded portion 18 of the sleeve projects beyond the cylindrical casing and threadedly receives a nut 24 which acts as a stop for limiting backward movement of the casing 11 during the removal operation.

In Figure 1 of the drawing, I have shown my invention in use wherein a part A which may represent a fly wheel is provided with a bearing seat B for the reception of an anti-friction bearing C through which a shaft is normally adapted to extend. The back of the fly wheel or part A being closed to the seat B, renders it impossible to drive the bearing C from said seat but with my improved instrument, it is possible to force the same therefrom.

The instrument is inserted through the bearing C with the jaws and screw in a retracted position, whereupon the seats 15 of the jaws are aligned with the inner peripheral walls of the bearing. The nut 24 is of course adjusted to a position against the outer end of the casing, after which the operator grasps the handles 22 and 23 and proceeds to impart a turning movement to the screw 21. The inner end of the screw 21 abuts the closed wall of the bearing recess and further turning of the screw causes the bevelled surfaces of the bevelled head 17 to move into wedging engagement with the bevelled end 14 of the cylindrical casing, causing the expansion of the jaws 13 into frictional engagement with the bearing C. Continuous rotation of the screw after the jaws are in clamping engagement with the bearing will force the bearing outward through the open side of the bearing recess. After the removal of the bearing from its seat, the nut 18 is loosened and the screw 21 is turned in an opposite direction to release the wedging action between the head 17 and the jaws whereupon the resilient jaws move to their normally retracted position which permits of the removal of the bearing from the instrument.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A bearing remover comprising a cylindrical member having its opposed side walls bifurcated inwardly from one end thereof to provide resilient jaws, a rotatable screw, and means operable upon rotation of said screw in one direction for expanding said jaws, said means including a non-rotatable element to which said screw is threadedly connected, said element and the adjacent walls of said jaws having co-acting bevelled faces therebetween.

2. A bearing remover comprising a cylindrical member, resilient jaws provided thereon, having bevelled surfaces provided thereon, a non-rotatable sleeve extending through said cylindrical member having bevelled surfaces in co-acting engagement with said first mentioned bevelled surfaces, an adjustable stop on said sleeve with which one end of said cylindrical member abuts, and a screw shaft passing through said sleeve and threadedly connected therewith.

3. A bearing remover comprising a cylindrical member, resilient jaws provided at one end thereof, bearing seats provided on the exterior of said jaws, said jaws having bevelled surfaces on the free ends thereof, a sleeve extending through said cylindrical member, an adjustable stop on said sleeve with which said cylindrical member abuts, a bevelled head provided on said sleeve and co-acting with the bevelled surfaces on said jaws, a screw passing through said sleeve and threadedly connected therewith, and means for allowing a limited sliding movement of said sleeve with respect to said cylindrical member but for preventing turning of one with respect to the other during turning of said screw.

4. A bearing remover comprising a cylindrical member, resilient jaws provided at one end thereof, bearing seats provided on the exterior of said jaws, said jaws having bevelled surfaces on the free ends thereof, a sleeve extending through said cylindrical member, an adjustable stop on said sleeve with which said cylindrical member abuts, a bevelled head provided on said sleeve and co-acting with the bevelled surfaces on said jaws, a screw passing through said sleeve and threadedly connected therewith, and means for allowing a limited sliding movement of said sleeve with respect to said cylindrical member but for preventing turning of one with respect to the other during turning of said screw, said means including a hand grip fixed to said sleeve and extending through a slot in said cylindrical member.

In testimony whereof I have affixed my signature.

VICTOR NIELSEN.